US011939891B2

(12) United States Patent
Mariotti

(10) Patent No.: US 11,939,891 B2
(45) Date of Patent: Mar. 26, 2024

(54) INTERNAL COMBUSTION ENGINE WITH CAMSHAFT VALVE PHASE VARIATION DEVICE

(71) Applicant: PIAGGIO & C. S.P.A., Pontedera (IT)

(72) Inventor: Walter Mariotti, Pontedara (IT)

(73) Assignee: PIAGGIO & C. S.P.A., Pontedara (IT)

( * ) Notice: Subject to any disclaimer, the term of this patent is extended or adjusted under 35 U.S.C. 154(b) by 12 days.

(21) Appl. No.: 17/641,727

(22) PCT Filed: Sep. 11, 2020

(86) PCT No.: PCT/IB2020/058451

§ 371 (c)(1),
(2) Date: Mar. 9, 2022

(87) PCT Pub. No.: WO2021/048801

PCT Pub. Date: Mar. 18, 2021

(65) Prior Publication Data

US 2022/0298932 A1 Sep. 22, 2022

(30) Foreign Application Priority Data

Sep. 13, 2019 (IT) ........................ 102019000016271

(51) Int. Cl.
*F01L 1/344* (2006.01)
*F01L 1/02* (2006.01)
(Continued)

(52) U.S. Cl.
CPC ................. *F01L 1/344* (2013.01); *F01L 1/02* (2013.01); *F01L 1/022* (2013.01); *F01L 1/026* (2013.01);
(Continued)

(58) Field of Classification Search
CPC ... F01L 1/02; F01L 1/022; F01L 1/026; F01L 1/047; F01L 1/053; F01L 2001/0537; F01L 1/26; F01L 1/344; F02D 13/0215
See application file for complete search history.

(56) References Cited

U.S. PATENT DOCUMENTS 4,955,330 A * 9/1990 Fabi ........................ F01L 1/352 123/90.31
5,181,485 A * 1/1993 Hirose .................. F02F 1/4214 123/90.31
2008/0283010 A1* 11/2008 Bohner ................... B60T 13/52 123/198 C

FOREIGN PATENT DOCUMENTS

DE 10042041 A1 12/2001
EP 3511538 A1 7/2019
JP 2009185656 A 8/2009

OTHER PUBLICATIONS

International Search Report and Written Opinion Received for the PCT Application No. PCT/IB2020/058451 dated Dec. 14, 2020, 23 pages.

* cited by examiner

*Primary Examiner* — Loren C Edwards
(74) *Attorney, Agent, or Firm* — Amster, Rothstein & Ebenstein LLP

(57) ABSTRACT

A combustion engine for a vehicle includes a first centrifugal device for varying timing of a first plurality of suction or relief valves with respect to the drive shaft. A driving disc is mounted idle on a first camshaft which controls the valves, and at least one driven disc is integral with the camshaft. Drive elements for transmitting motion from the driving disc to the driven disc are interposed between the two discs causing a relative rotation of the driven disc with respect to the driving disc when the rotation speed of the discs exceeds a predetermined threshold. A distribution system connects
(Continued)

the drive shaft with the driving disc so as to cause the rotation thereof. A second gear meshes with a first gear so that rotation of the driving disc mounted on the first camshaft causes the rotation of the second camshaft to control other valves of the engine.

8 Claims, 7 Drawing Sheets

(51) Int. Cl.

| | |
|---|---|
| ***F01L 1/047*** | (2006.01) |
| ***F01L 1/053*** | (2006.01) |
| ***F01L 1/26*** | (2006.01) |
| ***F02D 13/02*** | (2006.01) |

(52) U.S. Cl.

CPC ............... *F01L 1/047* (2013.01); *F01L 1/053* (2013.01); *F01L 1/26* (2013.01); *F02D 13/0215* (2013.01); *F01L 2001/0537* (2013.01)

INTERNAL COMBUSTION ENGINE WITH CAMSHAFT VALVE PHASE VARIATION DEVICE

CROSS REFERENCE TO RELATED APPLICATIONS

This application claims benefit under 35 U.S.C. § 371 to international application No. PCT/IB2020/058451 filed on Sep. 11, 2020, which claims priority to French application No. IT 102019000016271 filed on Sep. 13, 2019, the contents of which are incorporated by reference in their entireties.

FIELD OF THE INVENTION

The present invention relates to the field of production of vehicles having a ridable seat, this term in general meaning a motorcycle or motor vehicle having two, three or four wheels, mainly intended to transport people. The present invention in particular relates to a combustion engine for a vehicle having a ridable seat provided with a camshaft for controlling a plurality of (suction or relief) valves and a device for varying the phase of said camshaft, i.e. said valves, with respect to the drive shaft.

BACKGROUND ART

As is known, an internal combustion engine for a vehicle having a ridable seat comprises a drive shaft which rotation is caused by the movement of the pistons in the combustion chamber of the cylinder. The engine likewise comprises one or more suction valves for introducing an air-fuel mixture into the combustion chamber, and one or more relief valves for discharging combustion gases. The suction valves and the relief valves are controlled by respective camshafts mechanically connected to the drive shaft, through a distribution system which typically comprises gears, belts or chains. The rotation movement of the camshafts through the distribution system therefore is synchronized with the one of the drive shaft.

The term "timing" usually means the moment in which the opening and the closing of the suction and relief valves occurs with respect to a predetermined position of the piston. In particular, in order to define the timing, the opening advance (or delay) angle is considered with respect to the BDC (bottom dead center) and the closing advance (or delay) angle is considered with respect to the UDC (upper dead center). The advance angle is defined as the moment in which the valve reaches the complete open/closed position, ending the stroke thereof. Therefore, the advance angle values cause the instants in which the valve starts its opening motion (from completely closed) or closing motion (from completely open).

It is just as known that for a time interval, i.e. for a certain rotation angle of the drive shaft, the suction valves and the relief valves are simultaneously open. This range is called "crossing angle" and is the step in which the exhaust gases quickly leave the combustion chamber, inducing a suck which allows the suction of the fresh gases to be increased. The timing of the suction valves and the relief valves therefore causes the crossing angle value.

It is just as known that the value of the crossing angle causes various benefits according to the rotation speed of the drive shaft. An increased crossing angle value improves the performance at high speeds, but at low speeds causes poor efficiency of the engine in addition to an inefficient combustion, and therefore increased emissions. Contrarily, the engine loses efficiency at high rotation speeds if the crossing angle is quite curbed.

With respect to the above, various technical solutions have been proposed to vary the timing of the suction valves and/or the relief valves, i.e. to vary the value of the crossing angle of the valves, according to the rotation speed.

U.S. Pat. No. 9,719,381 describes one of these technical solutions. Specifically, U.S. Pat. No. 9,719,381 describes an engine in which the distribution system is of the DOHC (double overhead camshaft) type comprising two camshafts, one intended to control the suction valves and the other the relief valves, which camshafts are arranged above the engine head. The distribution system comprises three gear wheels: a driving wheel which is integral with the drive shaft and two driven wheels, each mounted idle on one of the two camshafts, close to an end thereof. The three (driving and driven) wheels are connected by a driving belt.

A device for varying the timing of the corresponding valves is provided for each of the camshafts. Such a device comprises a driving element which coincides with the driven wheel of the distribution system. The device further comprises a guide element keyed, through a grooved profile coupling, onto said end of the camshaft so as to take on a position adjacent to the driving element, whereby one side of the latter faces a side of the guide element. Drive elements of the motion in the form of balls are interposed between the driving element and the guide element. Each drive element is partially accommodated in a groove defined on the side of the driving element and partially on a corresponding groove defined on the side of the guide element. The grooves of the driving element have an inclination, assessed on a plane orthogonal to the rotation axis of the camshaft, which is different from the one of the grooves defined on the guide element. Therefore, each drive element is accommodated between two only partially facing grooves. Moreover, the related grooves for both components (driving element and guide element) have a curved profile assessed on a radial sectional plane.

The device described in U.S. Pat. No. 9,719,381 further comprises thrust means which act on the guide element, axially pushing it against the driving element. The rotation of the drive shaft is transmitted to the corresponding driving element mounted on the corresponding camshaft through the above-mentioned distribution system. The rotation motion of the driving element is transferred to the camshaft by the drive elements. As the rotation speed increases, the centrifugal force pushes the drive elements along the grooves towards the outside, i.e. away from the rotation axis of the camshaft. Due to the effect of the shape of the grooves, the guide element axially moves and at the same time, undergoes a relative rotation with respect to the driving element. This rotation results in a relative rotation of the camshaft with respect to the driving element (in phase with the drive shaft), and therefore in a variation of the timing of the corresponding valves.

As mentioned above, the distribution system in the technical solution described in U.S. Pat. No. 9,719,381 provides mounting a driven wheel on each of the camshafts. If on the one hand, this configuration of the distribution system promotes the phase variation of the suction valves and the one of the relief valves, it on the other hand is not always implementable, conventionally for reasons of space and costs.

If the phase variation is provided only at the discharge, the distribution system conventionally is simplified, as shown in accompanying FIGS. 1 to 3. In particular, a first shaft (701)

controlling the suction valves (711) and a second shaft (702) controlling the relief valves (712) are identified. The distribution system (500) provides a first driving wheel (801) which is integral with the drive shaft (not shown), a second driven wheel (802) rigidly keyed at an end of the first shaft (701) and a flexible element (803). A further gear wheel (850) is also keyed onto the first shaft (701), the further gear wheel always rotating in phase with the same first shaft (701). By providing a phase variation at the discharge, a centrifugal phase changer device is associated with the second shaft (702). Such a device could also be ascribable in function and structure to the one described in U.S. Pat. No. 9,719,381. In any event, since a phase changer device is involved, a toothed disc (901) mounted idle on the second shaft (702) and a guide element (902) which is integral with the second camshaft (702) are provided. Drive elements may be arranged between the toothed disc (901) and the guide element (902) according to the same principles, or ascribable to those described for U.S. Pat. No. 9,719,381.

The toothed disc (901) of the phase changer device meshes with the gear wheel (850) which is integral with the first camshaft (701). Thereby, the rotation of the gear wheel (850), which always rotates in phase with the drive shaft, is transferred to the second camshaft (702) through the toothed disc (901) forming the phase changer device.

Therefore, with respect to the solution described in U.S. Pat. No. 9,719,381, the distribution system in the solution shown in FIGS. 1 to 3 has a simpler configuration because the drive shaft is operatively connected to one of the camshafts alone. The latter therefore always remains in phase with the drive shaft and supports the gear wheel (850) which causes the rotation of the other camshaft. If on the one hand, the solution shown in FIGS. 1 and 3 simplifies the distribution system in terms of volumes and manufacturing costs, such a solution on the other hand in any case remains applicable exclusively in the case in which the phase variation is provided for one type of valves alone, conventionally the relief valves. Indeed, the known solution at hand (FIGS. 1 to 3) in any event requires one of the two camshafts to always be in PHASE with the drive shaft.

Another limitation of the solution shown in FIGS. 1 to 3 is identified in the position of the components which transmit the motion from one camshaft to the other, i.e. the position of wheel (850) and of the phase changer device (200). Such components occupy an intermediate position, i.e. far from both ends of the corresponding camshaft (701, 702). This intermediate position is a critical aspect in designing the engine cylinder-head and the related fusion. Indeed, the cylinder-head is to provide suitable enlargements at the areas in which the two drive elements (850-200) are positioned. At the same time, the intermediate position is certainly disadvantageous in terms of manufacturing costs because it requires longer and more burdensome processing.

With regard to the above-indicated considerations, the need emerges for arranging a new technical solution which on one hand, allows using a simple distribution system which at the same time is usable both if a phase variation is required at the discharge or the suction alone, and if the phase variation is required at the discharge and the suction.

SUMMARY OF THE INVENTION

The main task of the present invention is therefore to provide a combustion engine for a vehicle having a ridable seat which allows the above-indicated drawbacks to be overcome. Within the scope of this task, it is a first object of the present invention to provide an engine in which the distribution system has a simple configuration in terms of number of components and volumes. It is a second object, related to said first object, to provide an engine in which the transmission of the rotation motion to one of the two camshafts occurs through a component mounted on the other shaft and in which such a transmission is versatile with reference to the type of phase variation required (at the discharge and/or the suction). It is another object to provide an engine in which the configuration of the distribution system, camshafts and components for transmitting the rotation facilitates designing and manufacturing of the engine cylinder-head. It is a yet further object of the present invention to provide an engine which is reliable and easy to manufacture at competitive costs.

The Applicant has ascertained that the task and objects indicated above may be achieved by connecting the distribution system to the driving element of the phase changer device mounted on one of the camshafts and transferring, through two gears, the rotation of the same driving element to the other camshaft. More precisely, the above-mentioned task and objects are achieved through an internal combustion engine for a motor vehicle having a ridable seat, in which said engine comprises a drive shaft, a first camshaft which controls a plurality of suction valves and a second camshaft which controls a plurality of relief valves. The engine comprises at least a first centrifugal device for varying the timing of the valves of one of said plurality of valves, with respect to said drive shaft. Such a device comprises:

- a driving disc mounted idle on one of said camshafts which controls said one of said plurality of valves, said drive disc rotating about the rotation axis of said one of said camshafts;
- at least one driven disc which is integral with said one of said camshafts;
- drive elements for transmitting the motion between said driving disc and said driven disc, in which said discs and said drive elements are configured so as to cause a relative rotation of said driven disc with respect to said driving disc when the rotation speed of said discs exceeds a predetermined threshold.

The engine according to the invention further comprises a distribution system which mechanically connects said drive shaft with the driving disc so as to cause the rotation thereof.

The engine according to the invention is characterized in that it comprises a first gear which is integral with said driving disc and a second gear mounted on the other of said camshafts so that the rotation of said second gear directly or indirectly causes the rotation of said other of said camshafts. According to the invention, the second gear directly meshes with the first gear so that the rotation of said driving disc causes the rotation of the other of said camshafts selected to control the other of said plurality of valves. Therefore, the two gears are in mutual contact with each other.

The invention therefore provides exploiting the rotation of the driving disc of the phase changer device not only to bring into rotation the camshaft on which the same driving disc is installed, but also to rotate the other camshaft through the two gears. The distribution system therefore has the task of synchronizing the rotation of the drive shaft only with said driving disc and therefore has a relatively simple configuration with a reduced number of components. At the same time, the driving disc and the two gears involved in the transmission may be installed close to corresponding ends of the two camshafts, thus simplifying the design and manufacturing of the engine cylinder-head.

According to a possible embodiment, the distribution system comprises a first distribution wheel keyed onto said drive shaft, a second distribution wheel which is integral with said first disc, and a flexible drive element which connects said distribution wheels so that the rotation of said drive shaft is transferred to said driving disc. The distribution system advantageously requires one distribution wheel alone, and not two distribution wheels as provided in many conventional solutions.

The engine preferably comprises a sleeve body which is integral in rotation with said driving disc, in which said driving disc is placed at a first end of said sleeve body which comprises a flange portion defined at a second end, opposite to said first end, said second distribution wheel being connected to said flange portion of said sleeve body. The sleeve body advantageously facilitates the assembly of the phase changer device and the connection with the distribution system. Also possible inspection and/or maintenance operations of the engine are simplified.

According to a possible embodiment, the first gear is made in one piece with said driving disc, which takes on the configuration of a gear wheel.

According to a further possible embodiment, the second gear is made in one piece with said other of said camshafts.

In a possible embodiment, the first gear is mounted idle on said first camshaft and said second gear is mounted on said second camshaft. Therefore, a variation of the phase of the suction valves may be actuated in this embodiment, while the relief valves always keep the same phase with the drive shaft.

In an alternative embodiment, the driving disc is mounted idle on said second camshaft and said second gear is mounted on said first camshaft. A variation of the phase of the relief valves may be actuated in this embodiment, while the suction valves always keep the same phase with the drive shaft.

According to a further possible embodiment, said engine comprises a further centrifugal device for timing the phase of said valves which are controlled by said other of said camshafts, in which said further device comprises:

- a further driving disc mounted idle on said other of said camshafts, said further driving disc rotating about the rotation axis of said other of said camshafts;
- a further driven disc which is integral with said other of said camshafts;
- further drive elements for transmitting the motion between said further driving disc and said further driven disc, in which said further discs and said further drive elements are configured so as to cause a relative rotation of said further second disc with respect to said further first disc when the rotation speed of said further discs exceeds a predetermined threshold.

Said second gear is integral with said further driving disc so that the rotation of said driving disc mounted on said one of said camshafts is transferred to said further driving disc mounted on said other of said camshafts. Advantageously, the engine may provide a phase variation with the same configuration of the distribution system, both during the suction and at the discharge.

LIST OF FIGURES

Further features and advantages of the invention shall be more apparent from an examination of the following detailed description of some preferred, but not exclusive, embodiments of the engine according to the present invention, shown by way of non-limiting example, with the support of the accompanying drawings, in which.

The same numerals and reference letters in the Figures identify the same elements or components.

DETAILED DESCRIPTION

Figure 1:
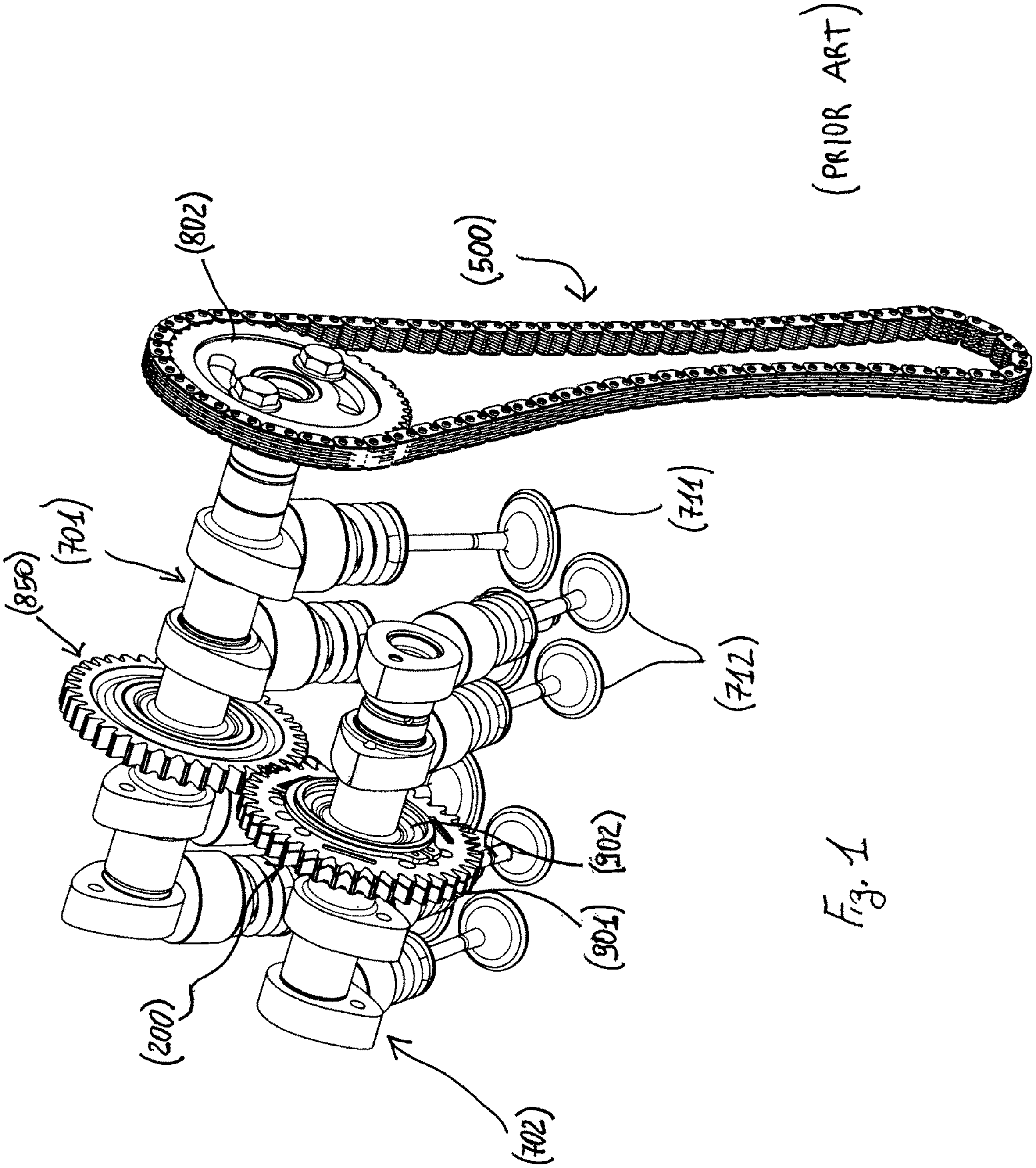
(PRIOR ART) Fig. 1
FIGS. 1 to 3 are diagrammatic views of an engine known from the prior art.

The present invention relates to a combustion engine for a motor vehicle having a ridable seat, this term in general meaning a motorcycle or motor vehicle having two, three or four wheels, mainly intended to transport people.

Engine 1 according to the invention comprises a first camshaft 10, rotating about a first rotation axis 101, and a second camshaft 20, rotating about a second rotation axis 102, for controlling a plurality of suction valves 110 and a plurality of relief valves 210, respectively. Engine 1 likewise comprises at least a first device 2 for varying the timing of the valves 110, 210 of one of the two camshafts 10, 20 with respect to the drive shaft.

In the embodiment shown in FIGS. 9 to 13, device 2 is applied to the first camshaft 10 to vary the phase of the suction valves 110 with respect to the drive shaft 300. However, as shown in the schematization in FIG. 11, device 2 could be operatively associated with the second camshaft 20 to vary the phase of the relief valves 220. Therefore, while mainly describing the invention with reference to an engine with phase variation provided at the suction (i.e. for the suction valves), the technical solutions may be applied, mutatis mutandi, also to an engine in which the phase variation is provided at the discharge (i.e. for the relief valves). In essence, what is indicated below for the first camshaft and for the second camshaft for a configuration of the engine in which the phase variation is provided at the suction is to be considered valid for the second camshaft and for the first camshaft, respectively, in the event of a configuration of the engine in which the phase variation is provided at the discharge.

Some of the accompanying Figures (FIGS. 4 to 9) show only certain parts of an internal combustion engine 1 according to the invention, while the other parts, which are not essential to understand the present invention, are not shown for reasons of increased illustrative clarity. Other accompanying Figures, which in any case are comprehensible to those skilled in the art, are only schematizations of possible embodiments of an engine according to the present invention.

The drive shaft is not shown in the accompanying Figures, rather is diagrammatically indicated with an axis having reference numeral 300. Device 2 is indicated also with the term "phase changer 2" or "phase changer device 2" in the continuation of the description. With reference to the components of the phase changer 2, the terms "axial" and "axially" refer to distances, thicknesses and/or positions assessed along the rotation axis 101, 102 of the first camshaft 10 with which the phase changer is operatively associated.

According to the invention, the phase changer device 2 employed is of the centrifugal type and therefore operates according to a principle which in itself is known. Device 2 comprises a driving disc 11 (or first disc 11), a driven disc 12 (or second disc 12) and plurality of drive elements 40, each of which being interposed between the two discs 11, 12 indicated above. The drive elements 40 and discs 11, 12 are configured so as to cause a rotation of the second disc 12 with respect to the first disc 11 when the rotation speed exceeds a predetermined threshold.

For this purpose, according to a principle which in itself is known, the driving disc 11 is mounted idle on the first camshaft 10 so that the two components (the first camshaft 10 and the first disc 11) rotate about the same rotation axis 101. The first disc 11 is "idle", in the sense that it keeps a degree of freedom of rotation with respect to the first camshaft 10 on which it is mounted, and vice versa.

The driven disc 12 is connected to the same first camshaft 10 but in an integral manner, i.e. so as to rotate integrally with the same rotation axis 101, 102. Therefore, the two discs 11, 12 rotate about the first rotation axis 101. In this regard, the driven disc 12 may be made in one piece with the first camshaft 10 (as in the Figures) or alternatively made separately, and then rigidly keyed thereto (for example, through a key connection or a connection with grooved profiles).

According to what is conventionally provided in a centrifugal phase changer, first grooves 31 partially facing second grooves 32 defined on a side 122 of the driven disc 12 are defined on a side 111 of the driving disc 11. Each of the drive elements 40 is partially accommodated in one of said first grooves 31 and partially in one of said second grooves 32. As the centrifugal force increases, caused by the increase of the rotation speed, each of the drive elements 40 moves along the two grooves 31, 32 between a first position, closest to the rotation axis 101 of the two discs 11, 12, to a second position, furthest from the same rotation axis. According to the cases, the first grooves 31 are configured in direction and/or shape in a different manner from the second grooves 32 so that reaching said second position is accompanied by a relative rotation of the second disc 12 with respect to the first disc 11. Such a translation results in the variation of the phase of the valves with respect to the drive shaft 300.

Figure 9:
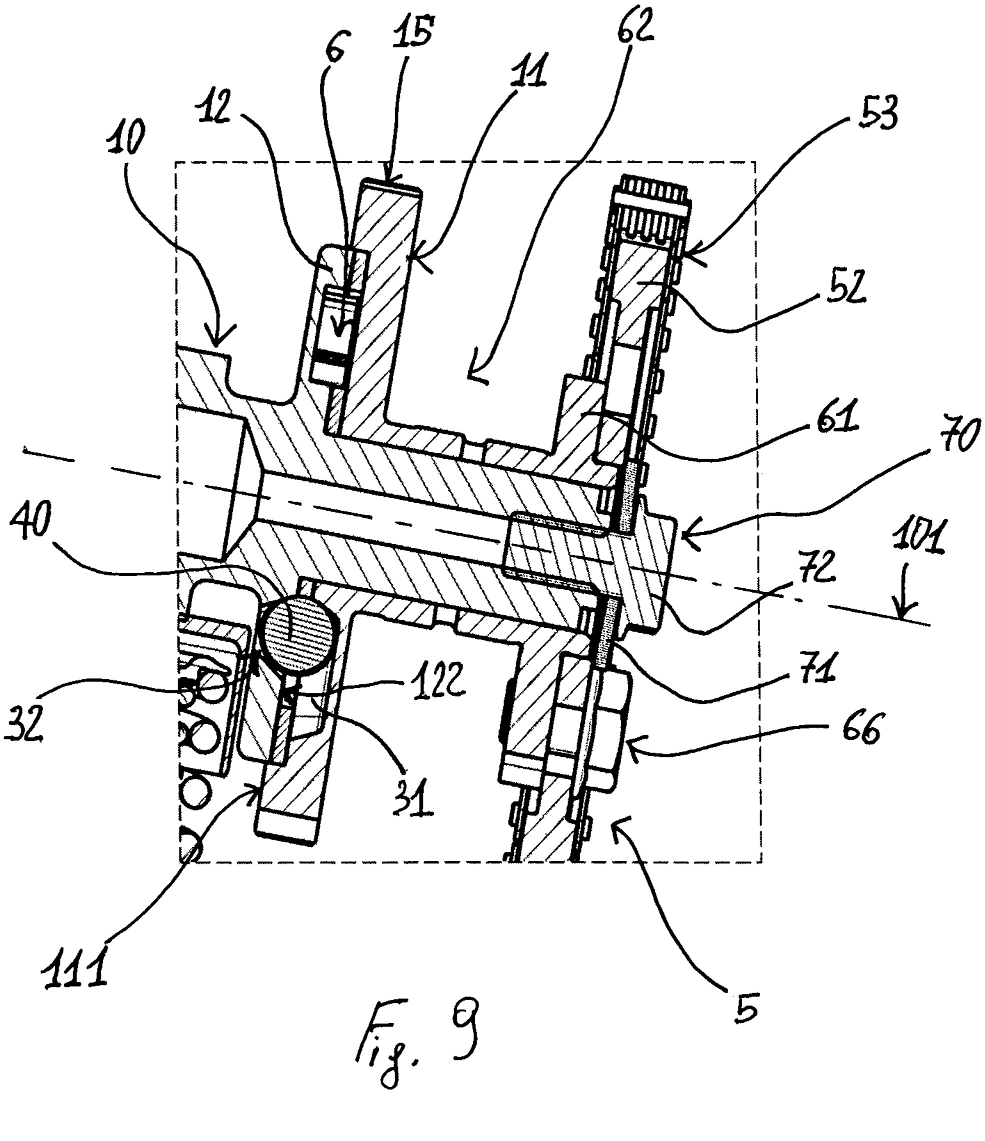
FIG. 9 is an enlargement of the detail IX-IX indicated in FIG. 7.
Figure 10:
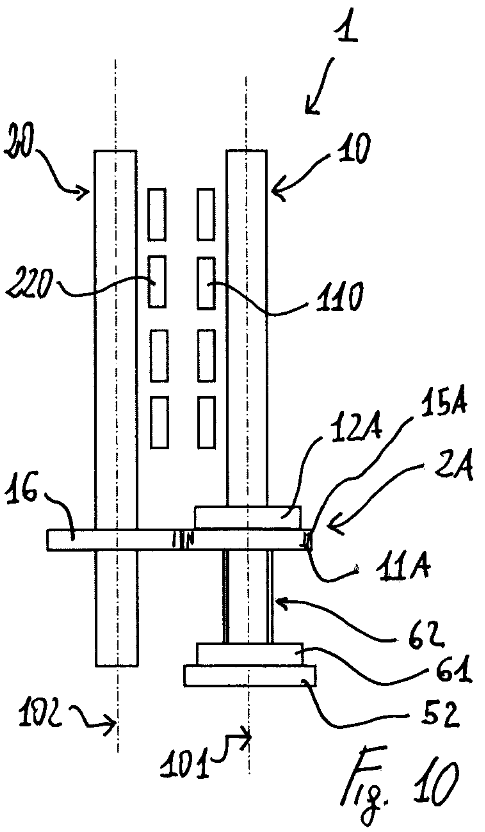
FIGS. 10 and 13 are diagrammatic views related to possible embodiments of an engine according to the present invention.

The detail in FIG. 9 allows a possible, and therefore non-exclusive, embodiment of the phase changer device 2 according to the invention, to be noted. In the embodiment shown in particular, the phase changer 2 comprises preloading means 70 configured so as to oppose the axial movement of the first disc 11 with respect to the second disc 12, and therefore so as to keep the drive elements 40 between the two discs 11, 12, each in the two grooves (first groove 31 and corresponding groove 32) in which it is accommodated.

In the possible and non-exclusive embodiment shown in FIG. 9, the preloading means 70 comprise a Belleville spring 71 which acts on the flange portion 61 of the sleeve body 62 so as to push the latter towards the second disc 12. The Belleville spring 71 is interposed between the flange portion 61 and an adjusting screw 72 which coaxially screws to the end of camshaft 10, about which the flange portion 61 is arranged. The closing of screw 72 results in the compression of the Belleville spring 71, and therefore in an axial force which opposes the first disc 11 moving away from the second disc 12.

The axial preloading means 70 could therefore be configured to prevent the relative movement of the first disc 11 with respect to the second disc 12, or only to counter such a movement, as occurs in the device described in U.S. Pat. No. 9,719,381 indicated above.

The phase changer 2 shown in FIG. 9 further comprises means 6 for retaining the drive elements 40 interposed between the first disc 11 and the second disc 12. Such retaining means 6 act on the drive elements 40, applying on each of them a force which tends to push the drive element 40 towards the first position indicated above (i.e. towards the rotation axis 101). The employment of retaining means 6 allows the clearances to be recovered between the drive elements 40 and the grooves 31, 32, thus making the transmission more efficient and at the same time allowing the shape of the components of the device itself to be simplified.

It is worth noting again that the shape of device 2, shown in detail in FIG. 9, is not essential for the invention, whose new and inventive features are described below. In this regard, device 2 could take on the configuration described in U.S. Pat. No. 9,719,381 indicated above.

In any event, according to the present invention, engine 1 comprises a distribution system 5 which mechanically connects the drive shaft 300 to the driving disc 11 so as to cause the rotation thereof about the rotation axis 101 thereof.

Again, according the invention, the driving disc 11 is integral with a first gear 15. Such a first gear 15 preferably is made in one piece with the driving disc 11 so that the driving disc 11 takes on the configuration of a wheel. In essence, in this shape, the driving disc 11 comprises an external ring gear defining the first gear 15. Engine 1 according to the invention comprises a second gear 16 mounted on the second camshaft 20 so that the rotation of the second gear 16 directly or indirectly causes the rotation of the second camshaft 20. According to the invention, the second gear 16 meshes with the first gear 15 so that the rotation of the first disc 11, mounted on the first shaft 10, is transferred, through the second gear 16, to the second camshaft 20. Advantageously, the rotation of the second camshaft 20 is therefore caused by the driving disc 11 of the phase changer device 2 provided for varying the timing of the valves controlled by the first camshaft 10.

As better described below, the term "directly" refers to a possible embodiment in which the second gear 16 is keyed onto the second camshaft 20 so as to rotate integrally therewith. The term "indirectly" instead refers to a possible embodiment in which the phase variation is provided both at the suction and at the discharge. In this hypothesis, the second gear 16 is integral with the driving disc 11B of a further phase changer device 2B operatively associated with the second camshaft 20 to vary the timing of the relief valves (see FIGS. 12 and 13).

Figure 2:
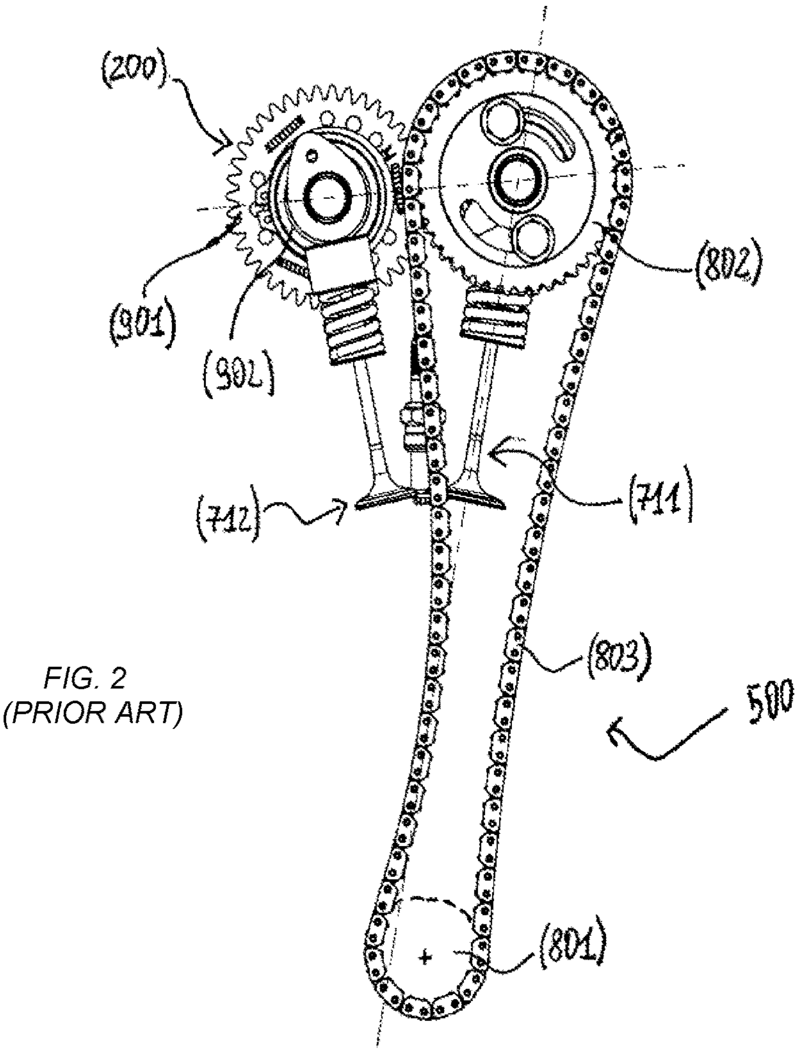
FIG. 2 (PRIOR ART)
Figure 3:
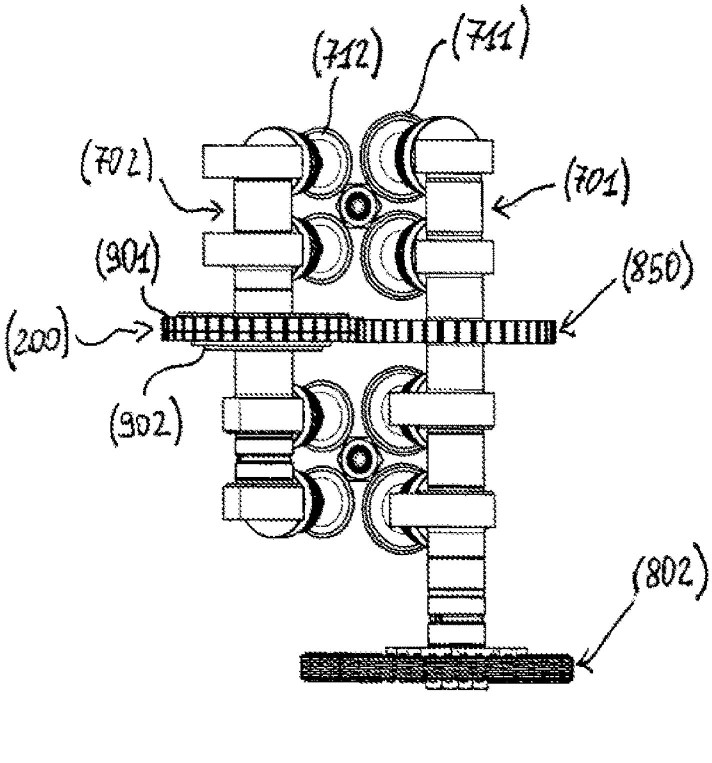
FIG. 3 (PRIOR ART)
Figure 4:
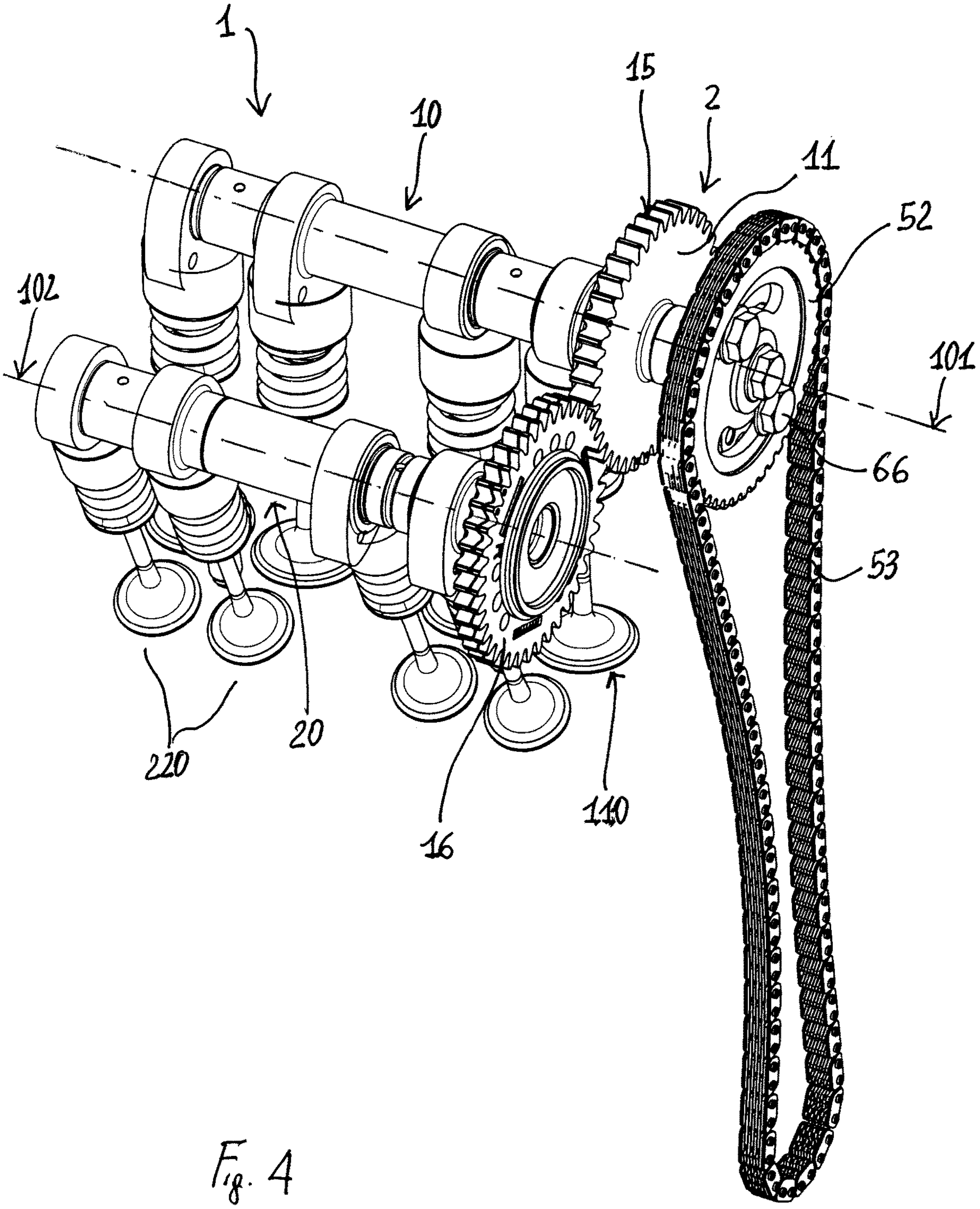
FIG. 4 is a diagrammatic view related to a possible embodiment of an engine according to the present invention.
Figure 6:
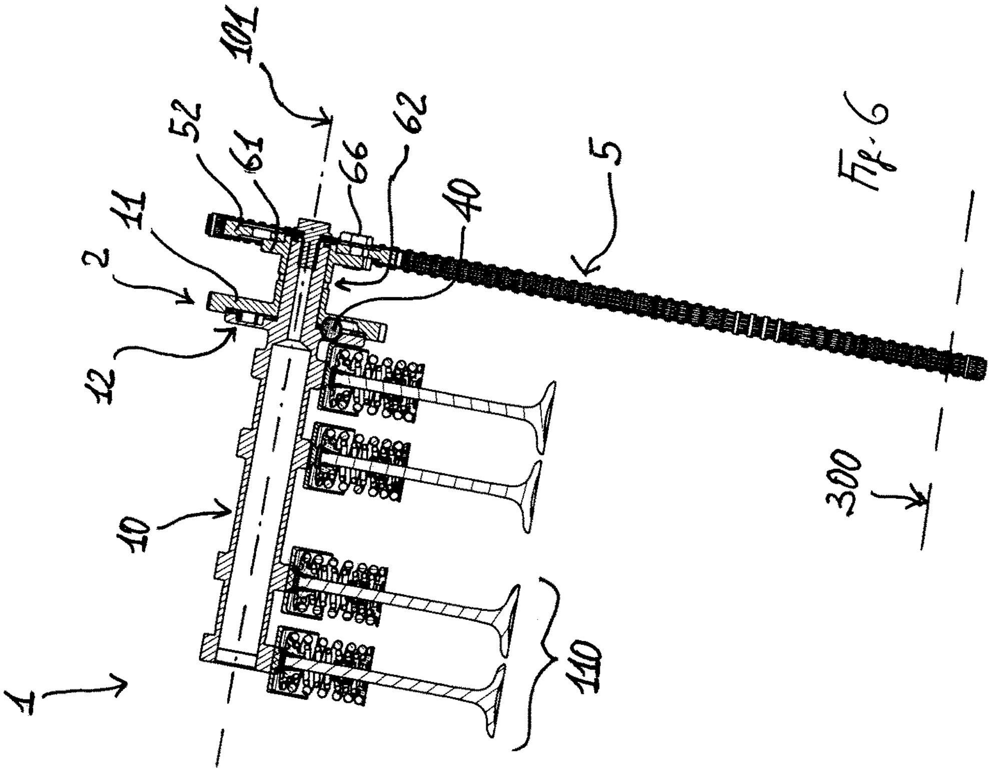
FIGS. 6 and 7 are two sectional views according to the sectional line VI-VI and the sectional line VII-VII, respectively.
Figure 5:
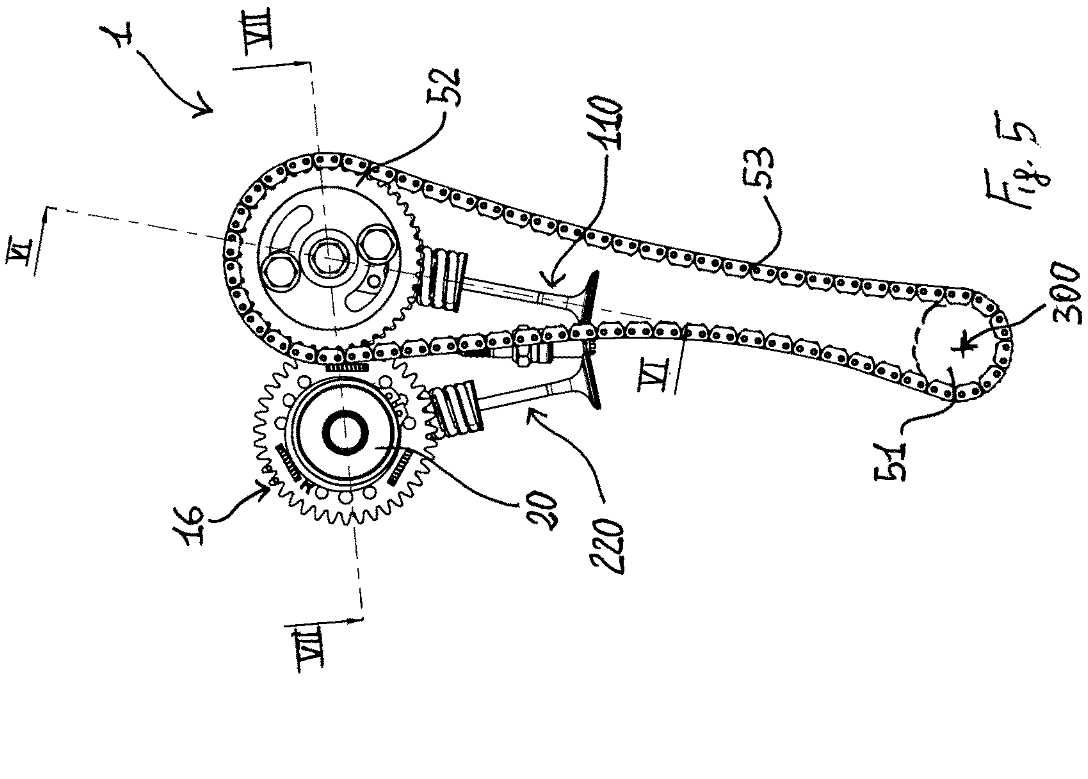
FIG. 5 is a further view of the engine in FIG. 4.
Figure 7:
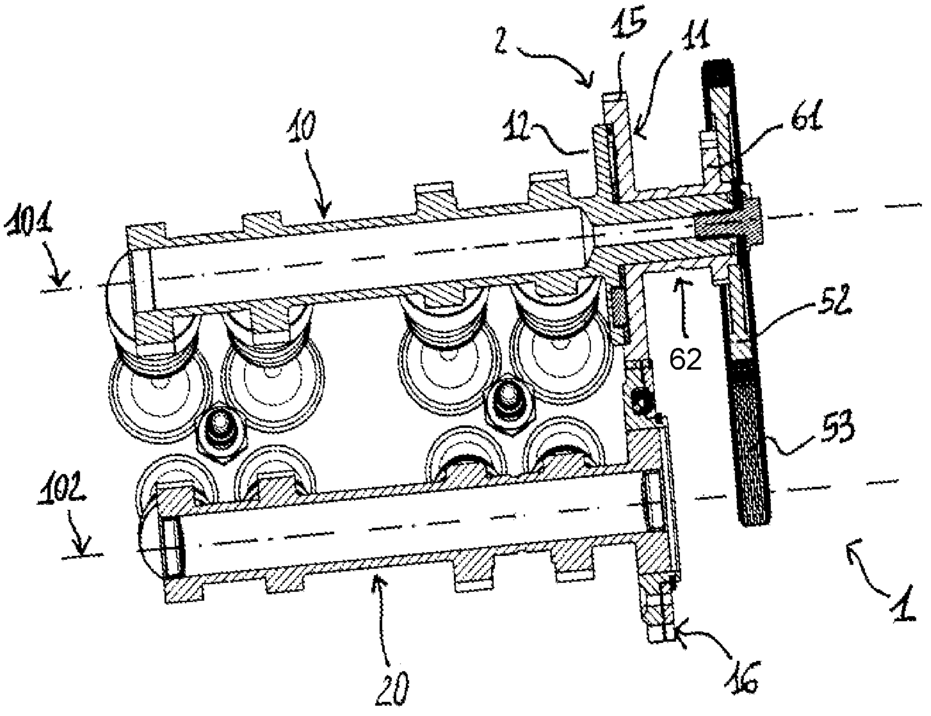
Figure 8:
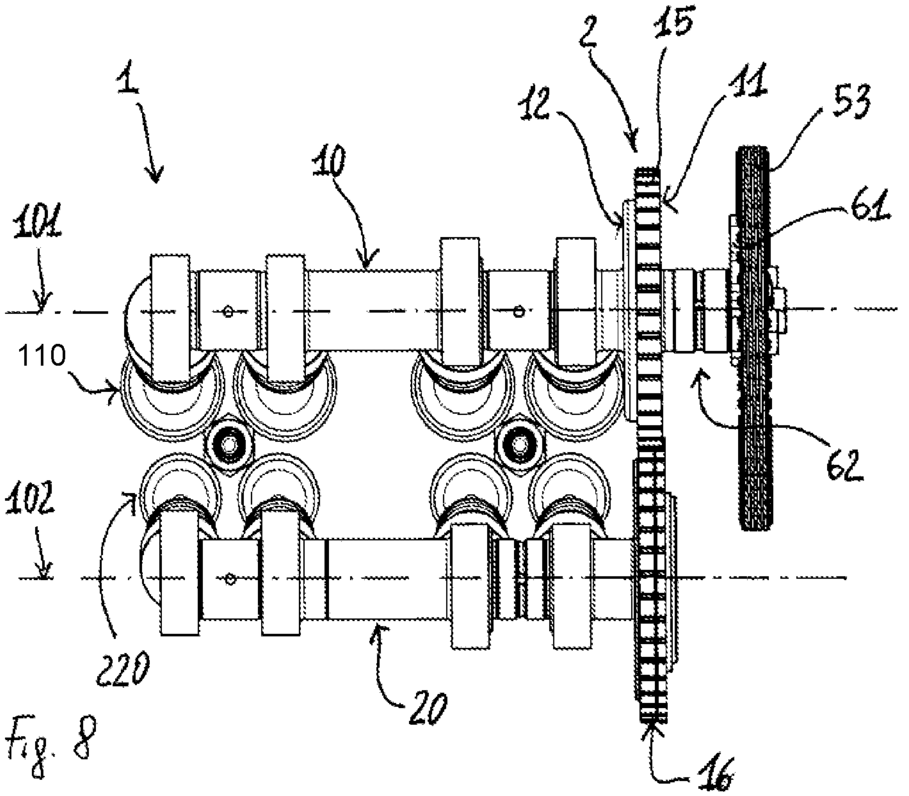
FIG. 8 is a further view of the engine in FIG. 4.

According to a possible embodiment shown in FIGS. 5 to 9, the distribution system 5 comprises a first distribution wheel 51, keyed onto the drive shaft 300 (indicated with a dashed line in FIG. 2), a second distribution wheel 52 which is integral with the first disc 11, and a flexible drive element 53 (in the form of chain or belt) which connects the two distribution wheels 51, 52 so that the rotation of the drive shaft 300 is transferred to the first disc 11 of the phase changer 2.

According to the embodiment (it also shown in FIGS. 4 to 9), the second distribution wheel 52 is connected to a flange portion 61 of a sleeve body 62 made in one piece with the driving disc 11. The driving disc 11 in particular is defined at a first end of the sleeve body 62, opposite to a second end defining the flange portion 61. The second distribution wheel 52 preferably is connected to the flange portion 61 through screw connection means 66 (see FIGS. 4 and 6). With reference to FIGS. 6 to 9, the sleeve body 62 preferably is mounted to an end part 10A of camshaft 10 so that the first disc 11 faces the second disc 12 for the objects already indicated above.

FIGS. 10 to 13 are schematizations of four possible embodiments (indicated by reference numeral 1, 1B, 1C, 1D) of the engine according to the present invention. The embodiment schematized in FIG. 10 substantially corresponds to the one shown in FIGS. 4 to 9.

Figure 11:
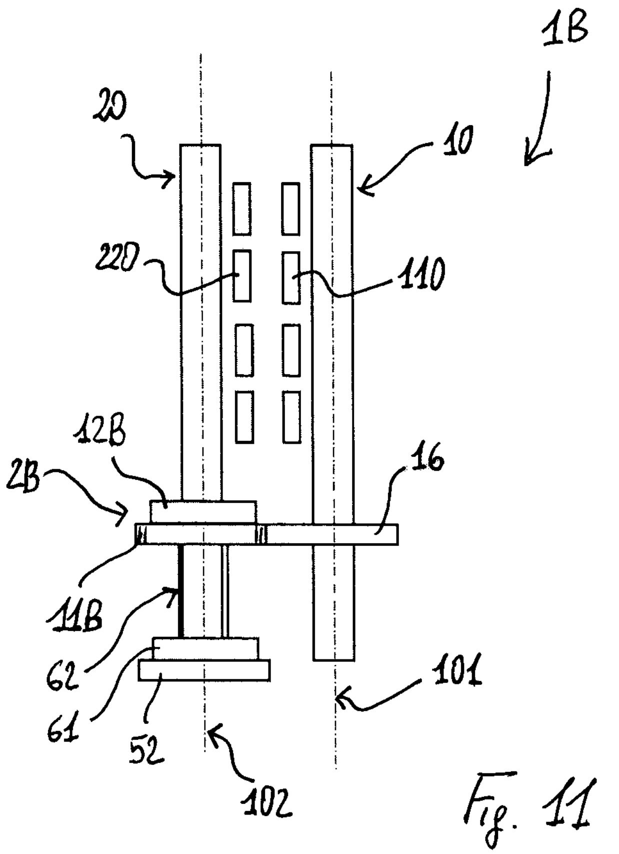

The embodiment shown in FIG. 11 refers to an engine 1B according to the invention, in which there is provided a phase variation at the discharge and therefore in which the phase changer device (indicated by reference numeral 2B) is operatively associated with the second shaft 20. As a result, the driving disc (indicated by 11B) is mounted idle on the second camshaft 20, while the driven disc (indicated by 12B) is integral with the same second camshaft 20. The second gear 16 which meshes with the first gear 15 which is integral with the driving disc 11B instead is keyed onto the first camshaft 10. According to the principles of the invention, the distribution system 5 is in any event configured to cause the rotation of the driving disc 11B. Therefore, sleeve 62, with which the second distribution wheel 52 and the same driving disc 11B are integral, is mounted at the end of the second camshaft 20.

It is worth noting in the embodiment shown in FIG. 11 that the suction valves 110 always keep the same timing with respect to the drive shaft 300. Indeed, the rotation of the first camshaft 10, caused by the distribution system, is transferred through the transmission defined by the first gear 15 (integral with the driving disc 11B) and by the second gear 16. The second camshaft 20 is therefore excluded from such a transmission, which second camshaft remains free to vary the angular position thereof with respect to the driving disc 11B to cause the phase variation of the relief valves 220.

Figure 12:
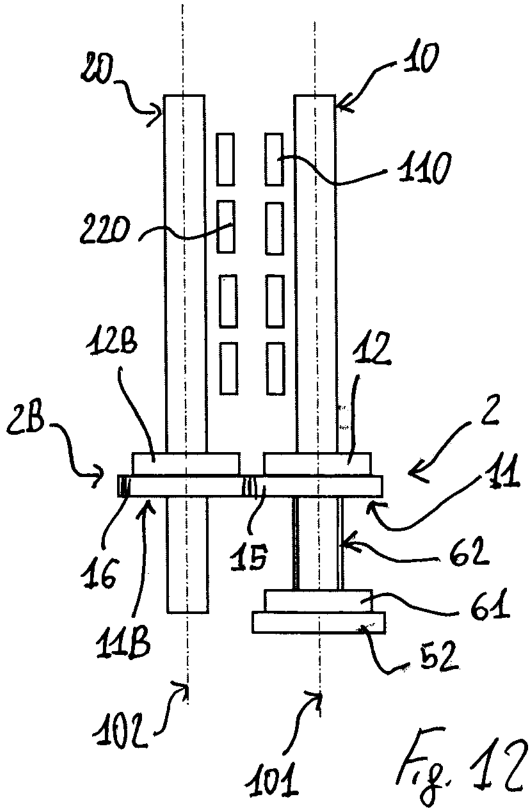

FIG. 12 relates to a possible embodiment (already mentioned above), in which the engine comprises a first device 2 operatively associated with the first camshaft 10 to vary the timing of the suction valves 110 and a second device (indicated by 2B) associated with the second camshaft 20 to vary the phase of the relief valves 220. In other words, in the configuration in FIG. 12, the phase variation is provided both for the suction and for the discharge.

The driving disc 11 of the first device 2A is therefore mounted idle on the first camshaft 10, while the related driven disc 12 is integral in rotation with the same first camshaft 10. In an entirely similar manner, the driving disc (indicated by 11B) of the second device 2B is mounted idle on the second camshaft 20, while the related driven disc (indicated by 12B) is integral in rotation with the second camshaft 20. The distribution system is configured to cause the rotation of the driving disc 11 of the first device 2. Therefore, sleeve 62, which is connected to the second distribution wheel 52, is keyed idle to the end of the first camshaft 10.

In the embodiment in FIG. 12, the second gear 16 is integral with the first disc 11B of the second device 2B provided to vary the timing of the relief valves 220. In this embodiment, the second gear 16 is mounted idle on the second camshaft 20 and indirectly transfers the motion to the second camshaft 20 through the second device 2B.

Again with reference to the embodiment in FIG. 12, overall the assembly of components formed by sleeve 62, the driving disc 11 of the first device 2, the first gear 15, the second gear 16 and the driving disc 11B of the second device 2B, always rotate in phase with the drive shaft 300. The two camshafts 10, 20, and therefore the related valves 110, 220, may instead vary the timing angle thereof with respect to the drive shaft 300.

Figure 13:
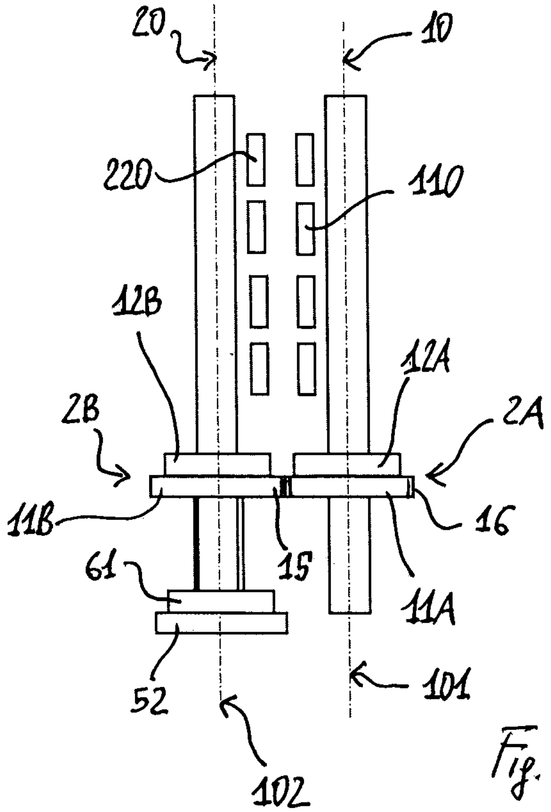

The embodiment shown in FIG. 13 differs from the one in FIG. 12 exclusively in that the distribution system is configured to cause the rotation of the driving disc 11B of the second device 2B. Here, sleeve 62, which is connected to the second distribution wheel 52, therefore is keyed idle to the end of the second camshaft 20. Accordingly, the first gear 15 is integral with the driving disc 11B of the second device 2B, while the second gear 16 is integral with the driving disc 11 of the first device 2. Therefore, the operating position of the two gears 15, 16 is inverted with respect to the embodiment shown in FIG. 12. In any event, for both embodiments discussed (FIG. 12 and FIG. 13), the rotation conferred to the driving disc (11 or 11B) connected to the distribution system 5 is exploited not only to rotate the camshaft (10 or 20) on which the same driving disc (11 or 11B) is mounted idle, but also to rotate (through the two gears 15, 16) the other camshaft (20 or 10). This solution in any event allows a simple configuration of the distribution system to be kept because there is provided one distribution wheel alone associated with one of the camshafts. In other words, by using the same distribution system, it may be used both in a configuration in which the phase variation is provided for one type alone of valves (suction or discharge) and in a configuration in which the phase variation is provided for both types of valves (suction and discharge).

The invention claimed is:

1. An internal combustion engine of a motor vehicle having a ridable seat, said internal combustion engine comprising: a drive shaft, a first camshaft which controls a plurality of suction valves and a second camshaft which controls a plurality of relief valves, at least a first centrifugal device for varying a timing of valves of a first one of said plurality of suction valves and said plurality of relief valves, with respect to said drive shaft, wherein said first centrifugal device comprises:

- a driving disc mounted idle on one of said first camshaft and said second camshaft which controls said first one of said plurality of suction valves and said plurality of relief valves, said driving disc rotating about a rotational axis of said one of said first camshaft and said second camshaft;
- a driven disc which is integral with said one of said first camshaft and said second camshaft;
- a plurality of drive elements for transmitting a motion between said driving disc, and said driven disc, wherein said driving disc, said driven disc and said plurality of drive elements are configured so as to cause a relative rotation of said driven disc with respect to said driving disc when a rotational speed of said driving disc and the driven disc exceeds a predetermined threshold,
- a distribution system which mechanically connects said drive shaft with said driving disc so as to cause a rotation thereof; and a first gear which is integral with said driving disc mounted on one of the first camshaft and the second camshaft, and a second gear mounted on a second one of said first camshaft and the second camshaft so that a rotation of said second gear directly or indirectly causes the rotation of said second one of said first camshaft and said second camshaft, wherein said second gear directly meshes with said first gear so that the rotation of said driving disc causes the rotation of said second one of said first camshaft and said second camshaft which controls a second one of said plurality of suction valves and said plurality of relief valves, and in that said distribution system comprises a first distribution wheel keyed onto said drive shaft, a second distribution wheel which is integral with said driving disc, and a flexible drive element which connects the first distribution wheel and the second distribution wheel so that the rotation of said drive shaft is transferred to said driving disc.

2. The internal combustion engine according to claim 1 further comprising a sleeve body which is integral in rotation with said driving disc, wherein said driving disc is placed at a first end of said sleeve body, said sleeve body including a flange portion defined at a second end, opposite to said first end, said second distribution wheel being connected to said flange portion of said sleeve body.

3. The internal combustion engine according to claim 2, futher comprising an axial preloading means which acts on said driving disc by opposing an axial translation with respect to said driven disc along a direction parallel to the rotational axis of said one of said first camshaft and said second camshaft.

4. The internal combustion engine according to claim 1, wherein said first gear is made in one piece with said driving disc, which takes on a configuration of a gear wheel.

5. The internal combustion engine according to claim 1, wherein said second gear is made in one piece with said second one of said first camshaft and said second camshaft.

6. The internal combustion engine according to claim 1, wherein said first gear is mounted idle on said first camshaft and said second gear is mounted on said second camshaft.

7. The internal combustion engine according to claim 1, wherein said driving disc is mounted idle on said second camshaft and said second gear is mounted on said first camshaft.

8. The internal combustion engine according to claim 1 further comprising a second centrifugal device for varying the timing of said plurality of suction valves and said plurality of relief valves which are controlled by said second one of said first camshaft and second camshaft, wherein said second centrifugal device comprises:

a further driving disc mounted idle on said second one of said first camshaft and said second camshaft, said further driving disc rotating about a rotational axis of said second one of said first camshaft and said second camshaft;

a further driven disc which is integral with said second one of said first camshaft and said second camshaft; and further drive elements for transmitting a motion between said further driving disc and said further driven disc, wherein said further driven disc and said further driving disc and said further drive elements are configured so as to cause a relative rotation of said further driven disc with respect to said further driving disc when the rotational speed of said further driven disc and said further driving disc exceeds the predetermined threshold, wherein said second gear is integral with said further driving disc so that the rotation of a first driving disc mounted on said first one of said first camshaft and said second camshaft is transferred to said further driving disc mounted on said second one of said first camshaft and said second camshaft.

* * * * *